United States Patent
Saitou et al.

(10) Patent No.: US 10,877,141 B2
(45) Date of Patent: Dec. 29, 2020

(54) DETECTION APPARATUS

(71) Applicant: DENSO CORPORATION, Kariya (JP)

(72) Inventors: Takashi Saitou, Nishio (JP); Koji Sakamoto, Kariya (JP); Takahisa Matsumoto, Kariya (JP); Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 235 days.

(21) Appl. No.: 15/765,185

(22) PCT Filed: Sep. 5, 2016

(86) PCT No.: PCT/JP2016/075929
§ 371 (c)(1),
(2) Date: Mar. 30, 2018

(87) PCT Pub. No.: WO2017/056858
PCT Pub. Date: Apr. 6, 2017

(65) Prior Publication Data
US 2018/0292521 A1    Oct. 11, 2018

(30) Foreign Application Priority Data
Oct. 2, 2015   (JP) ................... 2015-196790

(51) Int. Cl.
*G01S 13/56*   (2006.01)
*G01S 13/04*   (2006.01)
(Continued)

(52) U.S. Cl.
CPC .............. *G01S 13/56* (2013.01); *G01S 7/412* (2013.01); *G01S 13/04* (2013.01); *G01V 3/08* (2013.01);
(Continued)

(58) Field of Classification Search
USPC .......................................................... 342/28
See application file for complete search history.

(56) References Cited

U.S. PATENT DOCUMENTS 7,760,088 B2 *  7/2010  Tsuji ....................... G01S 13/04
                                               340/552
10,048,096 B2 *  8/2018  Grau ........................ G01D 5/48
(Continued)

FOREIGN PATENT DOCUMENTS

JP    H09228679 A    9/1997
JP    2003072441 A    3/2003
(Continued)

*Primary Examiner* — Peter M Bythrow
*Assistant Examiner* — Alexander L. Syrkin
(74) *Attorney, Agent, or Firm* — Harness, Dickey & Pierce, P.L.C.

(57) ABSTRACT

A detection apparatus includes: a transmitter transmitting an electric wave toward an inside of a vehicle; a receiver receiving the transmitted electric wave each time the transmitter transmits the electric wave, and performing output in accordance with reception strength of the received electric wave; and a determination portion, based on the reception strength of the electric wave received by the receiver, comparing a change mode of the electric wave received by the receiver changing over time to a predetermined reference mode and determining whether a person is present between the receiver and the transmitter.

6 Claims, 13 Drawing Sheets

(51) Int. Cl.
  *G08B 25/10*    (2006.01)
  *G01S 7/41*    (2006.01)
  *G08B 21/22*    (2006.01)
  *G01V 3/08*    (2006.01)
  *G01V 3/12*    (2006.01)
(52) U.S. Cl.
  CPC .............. *G01V 3/12* (2013.01); *G08B 21/22* (2013.01); *G08B 25/10* (2013.01)

(56) References Cited

U.S. PATENT DOCUMENTS

| | | | |
|---|---|---|---|
| 2003/0038719 A1* | 2/2003 | Mattes | B60R 21/01534 340/541 |
| 2005/0099330 A1* | 5/2005 | Hausner | G01S 7/412 342/22 |
| 2005/0122222 A1* | 6/2005 | Takasuka | B60R 21/01552 340/573.1 |
| 2010/0198083 A1* | 8/2010 | Lin | A61B 5/6823 600/484 |
| 2010/0265117 A1* | 10/2010 | Weiss | G01S 13/887 342/22 |
| 2012/0235849 A1* | 9/2012 | Tatoian | G01S 13/0209 342/21 |
| 2014/0062792 A1* | 3/2014 | Schantz | G01S 5/02 342/451 |
| 2016/0138946 A1* | 5/2016 | Grau | G01D 5/48 342/361 |

FOREIGN PATENT DOCUMENTS

| | | |
|---|---|---|
| JP | 2004061308 A | 2/2004 |
| JP | 2006347298 A | 12/2006 |

\* cited by examiner

DISTRIBUTION RATIO TABLE

| POLARIZATION DIRECTION | DISTRIBUTION RATIO | |
|---|---|---|
| | FIRST DETECTION ANTENNA | SECOND DETECTION ANTENNA |
| 1 | 0 | 10 |
| 2 | 1 | 9 |
| 3 | 2 | 8 |
| 4 | 3 | 7 |
| ... | ... | ... |
| 10 | 9 | 1 |
| 11 | 10 | 0 |

Cs type (Cs = 11)

DETECTION APPARATUS

CROSS REFERENCE TO RELATED APPLICATIONS

This application is a U.S. National Phase Application under 35 U.S.C. 371 of International Application No. PCT/JP2016/075929 filed on Sep. 5, 2016 and published in Japanese as WO 2017/056858 A1 on Apr. 6, 2017. This application is based on and claims the benefit of priority from Japanese Patent Application No. 2015-196790 filed on Oct. 2, 2015. The entire disclosures of all of the above applications are incorporated herein by reference.

TECHNICAL FIELD

The present disclosure relates to a technique to detect a person who is present in a vehicle.

BACKGROUND ART

A known type of technique uses an electric wave to detect a person present in a vehicle. Patent Literature 1 proposes a technique in which an electric wave is transmitted toward a vehicle in a parking lot, so that a reflected wave from inside the vehicle is received by a device placed in the parking lot, and the presence or absence of a person in the vehicle is detected based on the reflected wave received.

PRIOR ART LITERATURE

Patent Literature

Patent Literature 1: JP H09-228679 A

SUMMARY OF INVENTION

Generally, the intensity of a reflected electromagnetic wave that is reflected by a human body increases as the frequency of the electromagnetic wave transmitted toward the body increases. That is, the reflected waves of electromagnetic waves having a higher frequency will have a greater intensity. In Patent Literature 1, an electric wave, also referred to herein as an electromagnetic wave, at a frequency as high as approximately 10 GHz is transmitted, and the presence or absence of a person in a vehicle is detected based on the intensity of the reflected wave.

The technique to detect the presence or absence of a person described in Patent Literature 1 uses an electromagnetic wave at such a high frequency that it may increase the size of the circuit in the detection apparatus.

It is an object of the present disclosure to provide a technique that miniaturizes the size of a circuit in an apparatus that detects a person who is present in a vehicle.

According to one example of the present disclosure, a detection apparatus includes: a transmitter that transmits an electromagnetic wave toward an inside of a vehicle; a receiver that receives the electromagnetic wave transmitted by the transmitter, and that provides an output based on the reception intensity of the electromagnetic wave received; and a determination portion that, based on the reception intensity of the electromagnetic wave received by the receiver, compares a change in the reception intensity over time to a predetermined reference intensity, and determines whether a person is present between the receiver and the transmitter.

According to this configuration, it may be possible to detect the presence or absence of a person in a vehicle based on an electromagnetic wave received by way of the person located between the transmitter and the receiver and thereby may be possible to use an electromagnetic wave at a frequency lower than that used in the technique described in Patent Literature 1, which detects the presence or absence of a person in a vehicle based on the intensity of the reflected wave itself, after the electromagnetic wave is reflected by the person. As a result, it may be possible to reduce the size of a circuit in the apparatus that detects a person present in a vehicle so as to be smaller than that of the conventional technique.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Embodiments of the present disclosure are described below with reference to the drawings.

1. First Embodiment

(1-1. Configuration)

Figure 1:
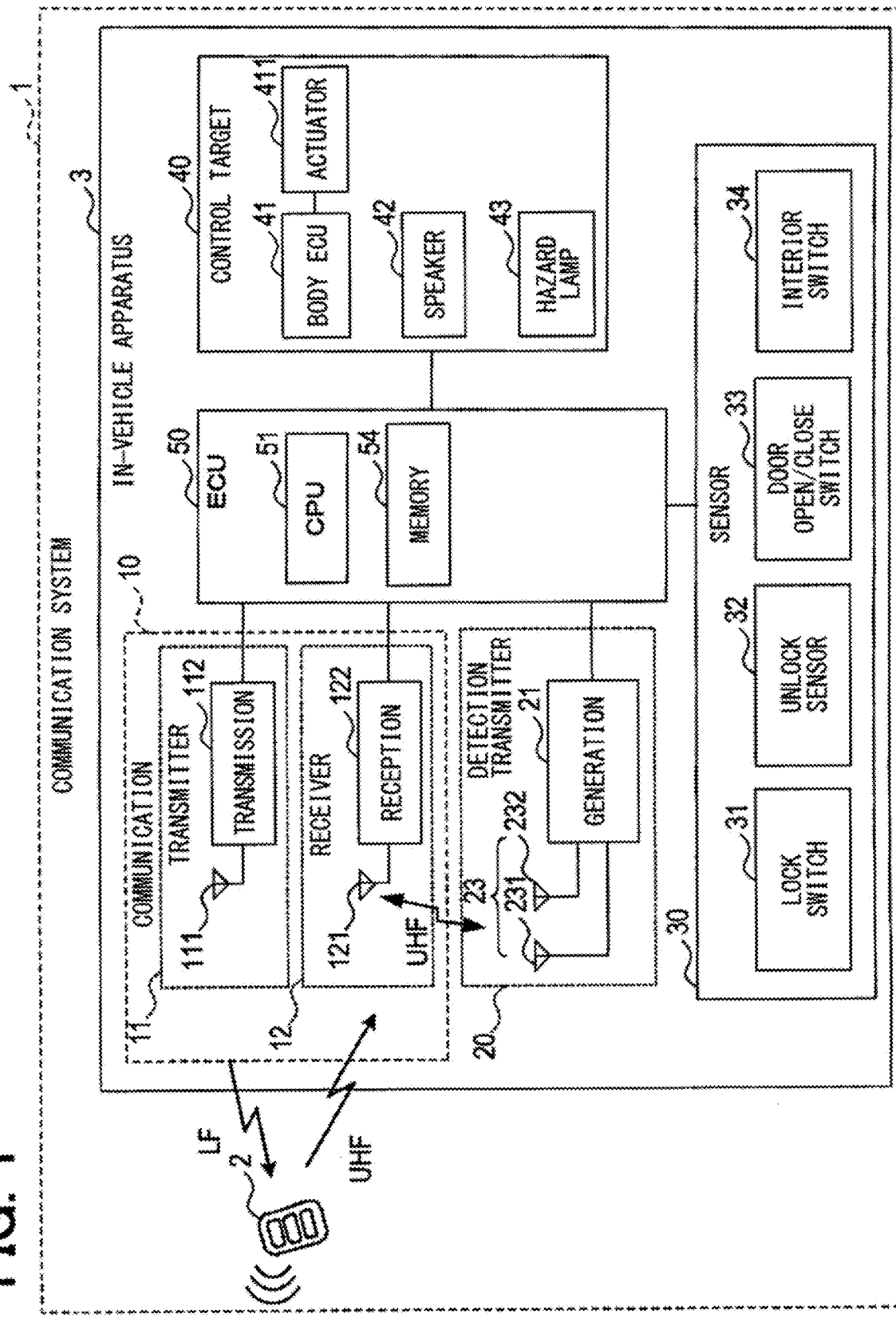
FIG. 1 is a block diagram showing a configuration of an in-vehicle apparatus and a smart entry system according to a first embodiment.

A communication system 1 illustrated in FIG. 1 performs predetermined control, such as, for example, locking and unlocking of a door and starting of an engine of a vehicle, at the time of getting in and out of the vehicle on the basis of a mobile terminal 2 carried by a user. The communication system 1 includes the mobile terminal 2 and an in-vehicle apparatus 3.

The mobile terminal 2 is configured as a wireless communication device that transmits and receives data to and from the in-vehicle apparatus 3. The mobile terminal 2 receives an electric wave, transmitted by the in-vehicle apparatus 3, at a predetermined frequency in an LF band. The LF band refers to, for example, a frequency band of one hundred kHz to several hundred kHz and may be approximately 100 kHz. The mobile terminal 2 demodulates the received electric wave using a predetermined method to acquire data from the in-vehicle apparatus 3. The mobile terminal 2 transmits an electric wave at a predetermined frequency in an UHF band to the in-vehicle apparatus 3, with the electric wave including data generated and modulated using a predetermined method. The data includes an authentication code to identify the mobile terminal 2. The UHF band refers to, for example, a frequency band of several hundred MHz and may be approximately 300 MHz to 400 MHz.

The in-vehicle apparatus 3 includes an in-vehicle communication portion 10, a detection transmitter 20, a sensor portion 30, a control ECU 50, and a control target portion 40. The ECU represents an electronic control unit. The in-vehicle apparatus 3 is configured so as to receive power all the time including when the ignition switch of the vehicle is turned off.

The in-vehicle communication portion 10 includes an in-vehicle transmitter 11 and an in-vehicle receiver 12.

The in-vehicle transmitter 11 includes an in-vehicle transmission antenna 111 and a transmission portion 112. In the in-vehicle transmitter 11, the transmission portion 112 transmits via the in-vehicle transmission antenna 111 a signal in the LF band generated by modulating data output by the control ECU 50 using a predetermined method.

Figure 2:
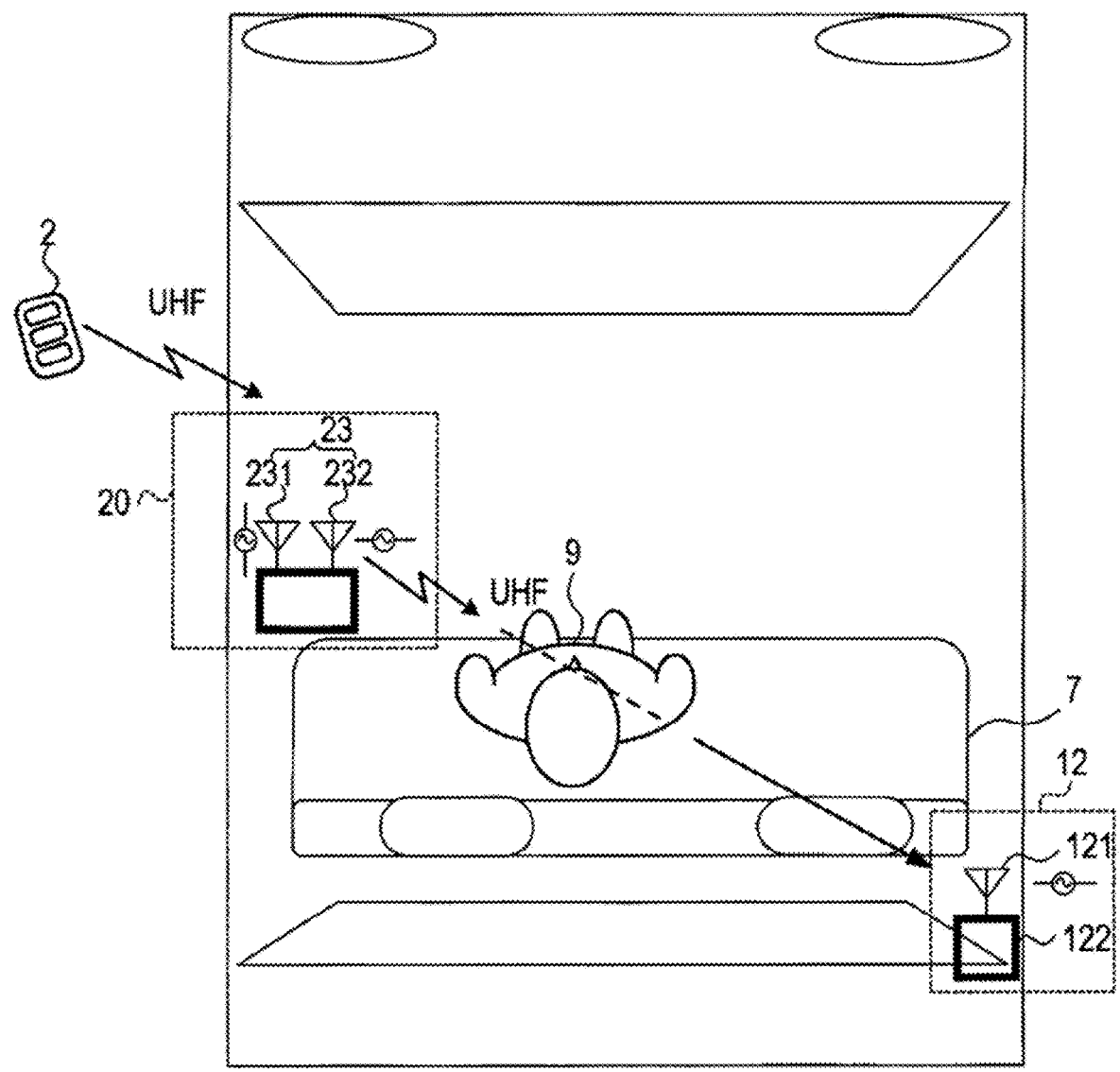
FIG. 2 is a diagram showing exemplary placement of an in-vehicle receiver and a detection transmitter.

As illustrated in FIG. 2, the in-vehicle receiver 12 is disposed on a vehicle inner side of a C pillar behind a rear seat 7. The in-vehicle receiver 12 includes an in-vehicle reception antenna 121 and a reception portion 122.

The in-vehicle reception antenna 121 is a dipole antenna that receives an electric wave having a polarization direction in a vehicle-width direction.

The reception portion 122 is configured to be able to receive both an electric wave in the UHF band from the mobile terminal 2 via the in-vehicle reception antenna 121 and an electric wave in the UHF band from the detection transmitter 20 via the in-vehicle reception antenna 121. The reception portion 122 outputs a reception signal resulting from demodulation of a received electric wave using a predetermined method to the control ECU 50. The reception portion 122 also outputs a strength signal that is an output in accordance with the reception strength to the control ECU 50. The reception strength refers to the strength of an electric wave received. The strength signal is a signal that is output as a voltage value.

The detection transmitter 20 is disposed on a surface of a floor of the vehicle near the rear seat 7 on a passenger seat side. Specifically, the position of the detection transmitter 20 relative to the in-vehicle receiver 12 is set such that an electromagnetic wave transmitted by the detection transmitter 20 toward the in-vehicle receiver 12 is blocked by a person 9 present in the rear seat 7 of the vehicle.

Figures 3, 4:
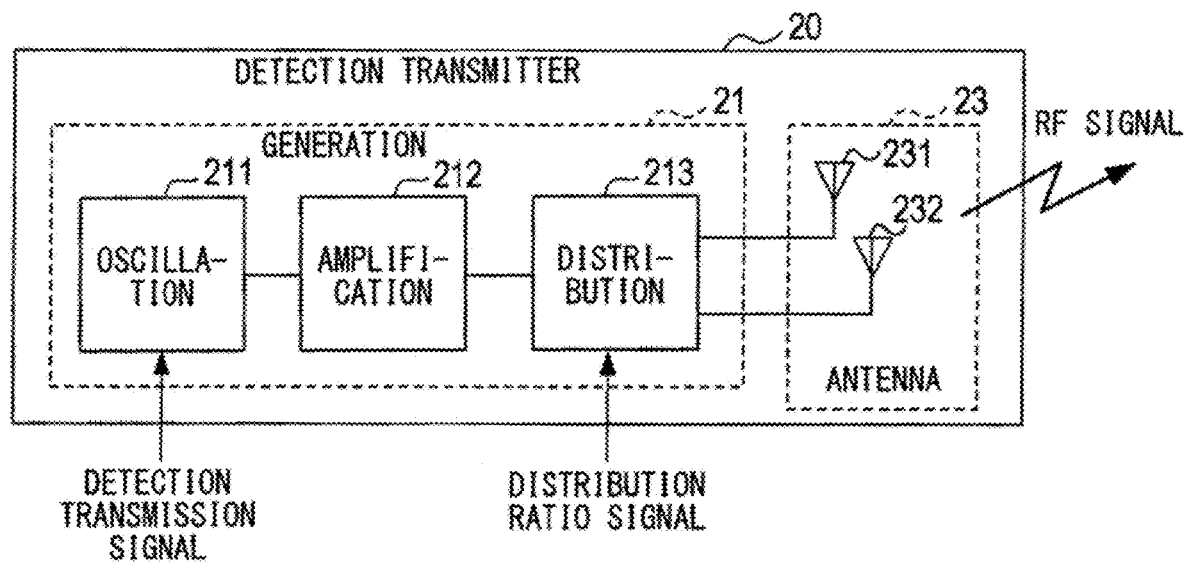
FIG. 3 is a block diagram showing a configuration of the detection transmitter.
FIG. 4 is a diagram showing an example of a distribution ratio table.

The detection transmitter 20 transmits non-modulated electric waves at a predetermined frequency in the UHF band toward the inside of the vehicle continuously or more than once. In the present embodiment, an example is described in which the detection transmitter 20 transmits electric waves toward the inside of the vehicle continuously. The non-modulated electric wave at a predetermined frequency in the UHF band transmitted by the detection transmitter 20 is hereinafter referred to as an RF signal. As illustrated in FIG. 3, the detection transmitter 20 includes a generation portion 21 and an antenna portion 23.

The antenna portion 23 includes two antennas having polarization directions orthogonal to each other. The polarization direction here refers to a direction in which an electric field oscillates in a plane formed by an electric field vector of an electric wave (electromagnetic wave) and a propagation direction. An electric wave having an electric field oscillating in a vertical direction may be called as an electric wave having a vertically polarized wave, and an electric wave having an electric field oscillating in a horizontal direction, which is orthogonal to the vertical direction, may be called as an electric wave having a horizontally polarized wave.

A first detection antenna 231, which is one of the two antennas, is a dipole antenna that transmits an electric wave having the polarization direction in a vehicle-length direction (hereinafter referred to as a first polarization direction). The vehicle-length direction refers to a longitudinal direction of the vehicle. A second detection antenna 232, which is the other one of the two antennas, is a dipole antenna that transmits an electric wave having the polarization direction in a vehicle-width direction (hereinafter referred to as a second polarization direction). The vehicle-width direction refers to a width direction of the vehicle.

The generation portion 21 generates and supplies an RF signal to the first detection antenna 231 and the second detection antenna 232. As illustrated in FIG. 2, the generation portion 21 includes an oscillation portion 211, an amplification portion 212, and a distribution portion 213.

The oscillation portion 211 generates RF signals continuously and supplies the RF signals to the amplification portion 212 while the oscillation portion 211 is receiving detection transmission signals from the control ECU 50. The oscillation portion 211 may be configured to generate an RF signal more than once each time the oscillation portion 211 receives a detection transmission signal from the control ECU 50.

The amplification portion 212 amplifies the RF signal received from the oscillation portion 211 such that the RF signal has a predetermined electric power and supplies the amplified RF signal to the distribution portion 213.

The distribution portion 213 divides the RF signal received from the amplification portion 212 into parts for the first detection antenna 231 and the second detection antenna 232. Here, the distribution portion 213 varies the ratio of the electric power of the RF signal to be distributed for the antennas in accordance with a distribution ratio signal received from the control ECU 50. The ratio of the electric power that is to be supplied to the first detection antenna 231 to the electric power that is to be supplied to the second detection antenna 232 is called as a distribution ratio.

For example, when the distribution ratio is 10:0, the distribution portion 213 supplies an RF signal to only the first detection antenna 231. Accordingly, the antenna portion 23 transmits an electric wave having the polarization direction in the first polarization direction.

When the distribution ratio is 0:10, the distribution portion 213 supplies an RF signal to only the second detection antenna 232. Accordingly, the antenna portion 23 transmits an electric wave having the polarization direction in the second polarization direction.

When the distribution ratio is 5:5, the distribution portion 213 supplies RF signals to the first detection antenna 231 and the second detection antenna 232 with the electric power divided into equal parts for the first detection antenna 231 and the second detection antenna 232. Accordingly, the antenna portion 23 transmits an electric wave having the polarization direction in a direction tilted by 45° from the first polarization direction to the second polarization direction.

That is, by varying the distribution ratio more than once from, for example, 0:10 to 1:9, then to 2:8, 3:7, 4:6, to 5:5, and keep varying until arriving at 10:0, the polarization direction of an electric wave transmitted from the antenna portion 23 can be varied in a range of 90° from the first polarization direction to the second polarization direction.

In this manner, the generation portion 21 varies the power ratio of RF signals to be supplied to the first detection antenna 231 and the second detection antenna 232 and thereby varies the polarization direction of an electric wave to be transmitted from the antenna portion 23 into more than one direction.

In the present embodiment, the generation portion 21 supplies RF signals in the same phase to the first detection antenna 231 and the second detection antenna 232.

With reference back to FIG. 1, the description is continued. The sensor portion 30 is disposed on each of entrance doors. Each sensor portion 30 includes a lock switch 31, an unlock sensor 32, a door open/close switch 33, and an interior switch 34 to serve as a sensor to detect an operation on a corresponding one of the entrance doors by a user.

The lock switch 31 and the unlock sensor 32 are disposed in an exterior door handle disposed on a corresponding one of the entrance doors. The lock switch 31 detects a pushing operation by a person and outputs an RF signal. The unlock sensor 32 detects contact by a person and outputs an RF signal.

The door open/close switch 33 detects opening of a corresponding one of the entrance doors and detects an RF signal. The interior switch 34 is disposed in an interior door handle disposed on a corresponding one of the entrance doors. The interior switch 34 detects an unlocking operation or a locking operation performed from the interior and outputs an RF signal.

The control target portion 40 includes a body ECU 41, a speaker 42, and a hazard lamp 43. The body ECU 41 is provided with an actuator 411.

The actuator 411 is disposed in each of the entrance doors and opens and closes a corresponding one of the entrance doors in response to a command from the body ECU 41.

When the body ECU 41 is set in a standby state and receives an RF signal from the unlock sensor 32, the body ECU 41 operates a corresponding one of the actuators 411 to unlock a corresponding one of the entrance doors that includes the unlock sensor 32. When the body ECU 41 is set in the standby state and receives an RF signal from the lock switch 31, the body ECU 41 operates a corresponding one of the actuators 411 to lock a corresponding one of the entrance doors that includes the lock switch 31.

In this manner, the communication system 1 allows a user who is carrying the mobile terminal 2 to lock and unlock the entrance doors without the user performing special operations.

The speaker 42 generates a warning sound toward the outside of the vehicle in response to a command from the control ECU 50.

The hazard lamp 43 flashes repeatedly in response to a command from the control ECU 50.

The control ECU 50 is configured using a known type of microcomputer that includes a CPU 51 and a semiconductor memory (hereinafter referred to as a memory 54), such as a ROM, a RAM, and a flash memory. The control ECU 50 achieves its various functions when the CPU 51 executes a program stored in a non-transitory tangible storage medium. In this example, the memory 54 corresponds to the non-transitory tangible storage medium that stores such program. When a program is executed, a method associated with the program is performed. The control ECU 50 may include one or more microcomputers.

Although not illustrated, the control ECU 50 includes at least a locking/unlocking processing portion and a detection processing portion that are included in the functions achieved when the CPU 51 executes the program.

The method to achieve such elements that configure the control ECU 50 is not limited to that using software. A part or all of such elements may be achieved by using hardware that combines a logical circuit, an analog circuit, and the like.

The locking/unlocking processing portion sets the body ECU 41 in the standby state when the mobile terminal 2 carried by a user who is approaching the subject vehicle, which is at standstill, from outside the vehicle is a registered key or when the mobile terminal 2 carried by a user who has left the subject vehicle, which is at standstill, is a registered key. A registered key refers to the mobile terminal 2 registered for each vehicle. The standby state refers to a state in which the body ECU 41 can accept an operation by a user who carries the mobile terminal 2.

The locking/unlocking processing portion determines that the mobile terminal 2 carried by a user is a registered key when an authentication code included in data received from the mobile terminal 2 agrees with an authentication code recorded in advance for each vehicle in the memory 54.

The detection processing portion compares a change mode of the reception strength of an RF signal, which is received by the in-vehicle receiver 12 from the detection transmitter 20, changing over time to a predetermined reference mode and determines whether a person is present between the in-vehicle receiver 12 and the detection transmitter 20.

The change mode here refers to a manner in which the reception strength changes over time, and it may be, for example, a quantity of change in reception strength over time and a cycle of change in reception strength.

The reference mode refers to a predetermined manner in which the reception strength changes over time and which should serve as a reference. For example, the reference mode may be a manner in which the reception strength changes by a predetermined quantity of change per unit time and a manner in which the reception strength changes with a predetermined cycle.

The predetermined quantity of change per unit time refers to, for example, a quantity-of-change threshold value to be described hereinafter. The predetermined cycle may be, for example, a predetermined time period from when a person breathes in air until when the person breathes out air or a predetermined time period from when a person breathes out air until when the person breathes in air. A predetermined time period from when a person breathes in air until when the person breathes out air or a predetermined time period from when a person breathes out air until when the person breathes in air is hereinafter referred to as a breathing cycle reference value.

The memory 54 has, in addition to the programs, the quantity-of-change threshold value and the breathing cycle reference value recorded in advance therein for expressing the reference modes.

The memory 54 also has data such as the authentication code, a distribution ratio table, a breathing detection time, or the like in advance therein.

The authentication code is an identification number for identifying the mobile terminal 2 that is registered in advance in the subject vehicle as the registered key, as described above.

As illustrated in FIG. 4, the distribution ratio table sets the correspondence between the polarization direction and the distribution ratio. For example, the distribution ratio table indicates that the distribution ratio is set to 0:10 for a polarization direction 1 and that the distribution ratio is set to 10:0 for a polarization direction 2.

The breathing detection time is described hereinafter.

(1-2. Processing)

Detection processing performed by the control ECU 50, that is, the CPU 51, is described below with reference to flowcharts in FIG. 5A and FIG. 5B. The detection processing achieves a function of the detection processing portion.

When the subject vehicle is parked and all the entrance doors are locked, the detection processing is triggered. When the subject vehicle is parked, it is supposed that an engine stops. When an agent is omitted from a sentence in the description below, the control ECU 50 is the agent.

First, an RF signal is transmitted in S100. Specifically, a detection transmission signal is output, and thereby the generation portion 21 is caused to generate the RF signal. A distribution ratio signal is also output, and thereby the generation portion 21 is caused to transmit the RF signal via the antenna portion 23. The distribution ratio signal at this point in time has the initial value of the distribution ratio, which is 10:0.

A reception signal is acquired in S105 from the reception portion 122.

It is determined in S110 whether the RF signal from the detection transmitter 20 is received. As described above, the in-vehicle receiver 12 can receive an electric wave from both the mobile terminal 2 and the detection transmitter 20. Thus, it is determined that the RF signal from the detection transmitter 20 is received when an authentication code is not included in data of the reception signal received in S105. When the RF signal from the detection transmitter 20 is not received, the control ECU 50 is placed in a standby state. When the RF signal from the detection transmitter 20 is received, the flowchart proceeds to S115.

Quantity-of-change processing is performed in S115. In the quantity-of-change processing, the quantity of change over time in reception strength of the RF signal, which is transmitted by the detection transmitter 20, is detected. The quantity of change in reception strength over time refers to a quantity of change in reception strength in a unit change time, which is a predetermined time.

The unit change time may be set as appropriate, for example, to about one second to a few seconds. In the quantity-of-change processing, the quantity of change detected is recorded in the memory 54. The reception strength is determined based on the strength signal. Determining the reception strength based on the strength signal is simply expressed as acquiring the reception strength hereinafter.

It is determined in S120 whether a person is present between the in-vehicle receiver 12 and the detection transmitter 20. In other words, it is determined whether a person is present in the vehicle. Specifically, when the quantity of change acquired in S115 is equal to or greater than the predetermined quantity-of-change threshold value, it is determined that a person is present in the vehicle. The quantity-of-change threshold value is predetermined so as to allow the determination of whether a person is present between the in-vehicle receiver 12 and the detection transmitter 20. The quantity-of-change threshold value is defined based on experiment or the like.

Specifically, the quantity-of-change threshold value is set to a value greater than a value that represents a change in reception strength per unit change time occurring when an RF signal transmitted by the detection transmitter 20 is received by the in-vehicle receiver 12 with no person present in a vehicle. The unit change time may be set to, for example, one second to a few seconds. When it is determined that a person is present in the vehicle, the flowchart proceeds to S165. When it is determined that a person is not present in the vehicle, the flowchart proceeds to S125.

Polarization direction processing is performed in S125. In the polarization direction processing, the detection transmitter 20 is caused to transmit an RF signal with the polarization direction varied based on the distribution ratio table, so that RF signals are transmitted in polarization directions. The reception strength values of the RF signals, which are transmitted in the polarization directions, are acquired as received by the in-vehicle receiver 12. The polarization directions and the acquired reception strength values that are associated with the polarization directions are recorded in the memory 54.

Figure 8:
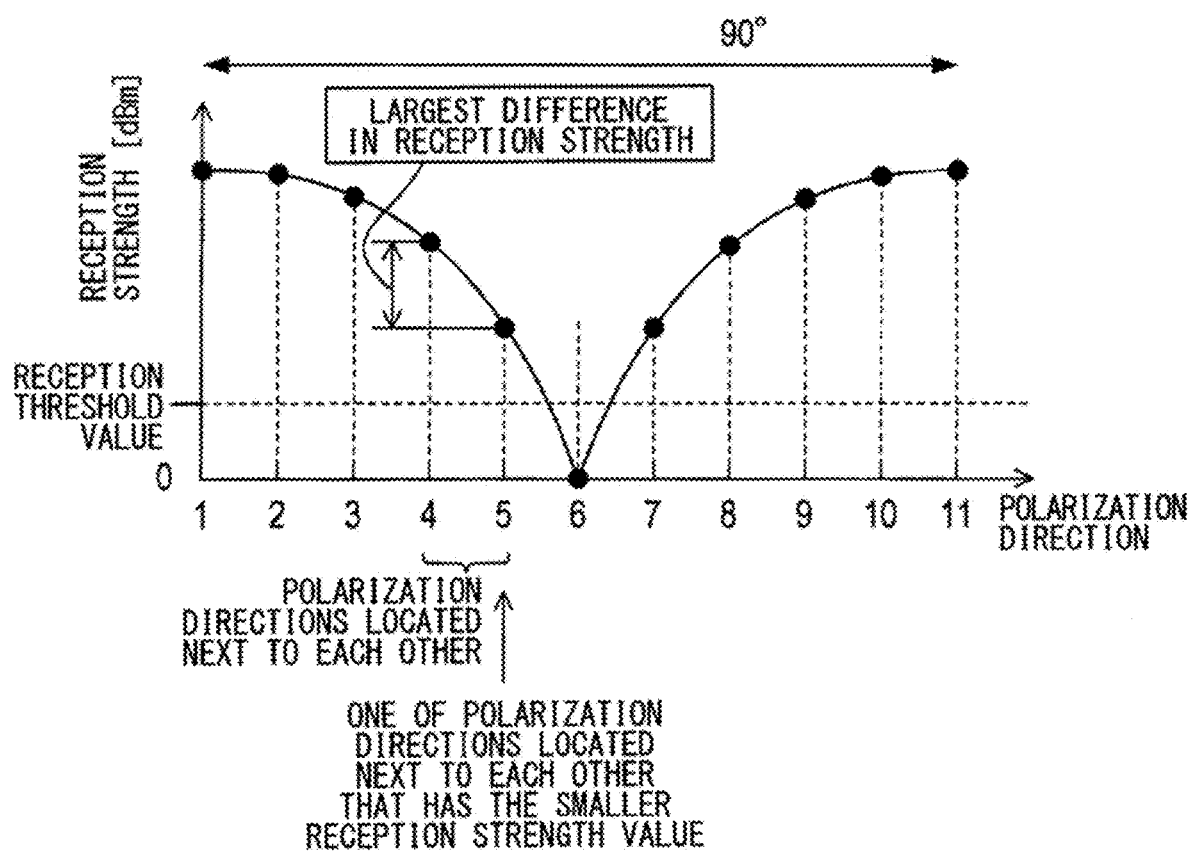
FIG. 8 is a diagram showing a designation of a transmission polarization direction.

In the polarization direction processing of the present embodiment, the reception strength values that are equal to or greater than a predetermined reception threshold value and their associated polarization directions only are recorded in the memory 54. In FIG. 8, which is provided as an example, the reception strength value in a polarization direction 6 is smaller than the reception threshold value. Specifically, in the case of FIG. 8, polarization directions 1 to 5 and 7 to 11, which are all the polarization directions except the polarization direction 6, and their associated reception strength values are recorded in the memory 54.

A transmission polarization direction is determined in S130. With an RF signal transmitted by the detection transmitter 20 with the polarization direction varied, so that RF signals are transmitted in polarization directions, the transmission polarization direction refers to one of polarization directions that are located next to each other and have reception strength values that produce the largest difference.

Here, polarization directions located next to each other are polarization directions one of which is located the closest to the other polarization direction and is larger than the other polarization direction, and polarization directions one of which is located the closest to the other polarization direction and is smaller than the other polarization direction. For example, in the case of the polarization direction 4 in the distribution ratio table, the polarization directions 3 and 4 are the polarization directions located next to each other, and the polarization directions 4 and 5 are the polarization directions located next to each other.

In the present embodiment, one of the polarization directions located next to each other that has the smaller reception strength value is designated as the transmission polarization direction. One of the polarization directions located next to each other that has the greater reception strength value may be designated as the transmission polarization direction.

Specifically, in FIG. 8 described above, the difference between the reception strength values of the polarization directions 4 and 5, which are located next to each other, is the largest, and the polarization direction 5, which has the smaller reception strength value of the two, is designated as the transmission polarization direction. An example in which the polarization direction 5 is the transmission polarization direction is described below.

The detection transmitter 20 is caused in S135 to transmit an electric wave having the polarization direction in the transmission polarization direction determined in S130. Specifically, a distribution ratio signal that is set to indicate the distribution ratio for the polarization direction 5 in accordance with the distribution ratio table recorded in the memory 54 is output to the generation portion 21.

The quantity-of-change processing is performed in S140. The quantity of change of the electric wave, which is transmitted by the detection transmitter 20 in S135 and has the polarization direction in the transmission polarization direction, is detected in this step in the quantity-of-change processing.

It is determined in S145 whether a person is present in the vehicle. Specifically, determination similar to that of S120 is performed. When it is determined that a person is present, the flowchart proceeds to S165. When it is determined that a person is not present, the flowchart proceeds to S150.

Change cycle processing is performed in S150. In the change cycle processing, the cycle of change in reception strength over time is detected. With the reception strength changing over time cyclically, for example, from a local maximum value to a local minimum value, and then from a local maximum value to a local minimum value, the cycle of change in reception strength over time refers to a time from when a local maximum value is detected until when the next local maximum value is detected or a time from when a local minimum value is detected until when the next local minimum value is detected. In the change cycle processing, the cycle of change in reception strength detected is recorded in the memory 54.

The breathing cycle reference value is acquired in S155 from the memory 54.

It is determined in S160 whether a person is present in the vehicle. Specifically, when the cycle of change in reception strength detected in S150 agrees with the breathing cycle reference value acquired in S155, it is determined that a person is present in the vehicle.

In the present application, agreement refers to a state that may not provide complete agreement but is still within a range of errors from the complete agreement and thus produces effects substantially similar to those produced by the complete agreement.

When it is determined that a person is present in the vehicle, the flowchart proceeds to S165. When it is determined that a person is not present, the flowchart proceeds to S170.

The flowchart proceeds to S165 when it is determined that a person is present in the vehicle in S120, S145, or S160. In S165, a detection flag is set. The detection flag is a flag that is set when the presence of a person in the vehicle is detected. After the detection flag is set, the flowchart proceeds to S175.

The flowchart proceeds to S170 when it is determined that a person is not present in the vehicle in S160. In S170, the detection flag is reset.

It is determined in S175 whether the detection flag is set. When the detection flag is set, the flowchart proceeds to S180. When the detection flag is not set, the flowchart proceeds to S185.

Notification processing is performed in S180. Specifically, the speaker 42 is caused to output a sound that notifies that a person is present in the vehicle. The hazard lamp 43 is also caused to flash.

The transmission of the RF signal is stopped in S185. Specifically, the output of the detection transmission signal to the detection transmitter 20 is stopped. The detection processing is finished.

As described above, in the detection processing, the in-vehicle receiver 12 receives an RF signal from the detection transmitter 20, the quantity of change in reception strength over time is detected, and it is determined whether a person is present in the vehicle based on the quantity of change. When it is not determined that a person is present in the vehicle based on the quantity of change, the detection transmitter 20 is caused to transmit an RF signal having the polarization direction in the transmission polarization direction, and it is determined again whether a person is present in the vehicle based on the quantity of change in reception strength over time.

Further in the detection processing, when the presence of a person in the vehicle is not detected based on the quantity of change, the cycle of change in reception strength of the RF signal transmitted by the detection transmitter 20 and having the polarization direction in the transmission polarization direction is detected. When the detected cycle agrees with a cycle of human breathing, it is determined that a person is present in the vehicle.

Figure 5A:
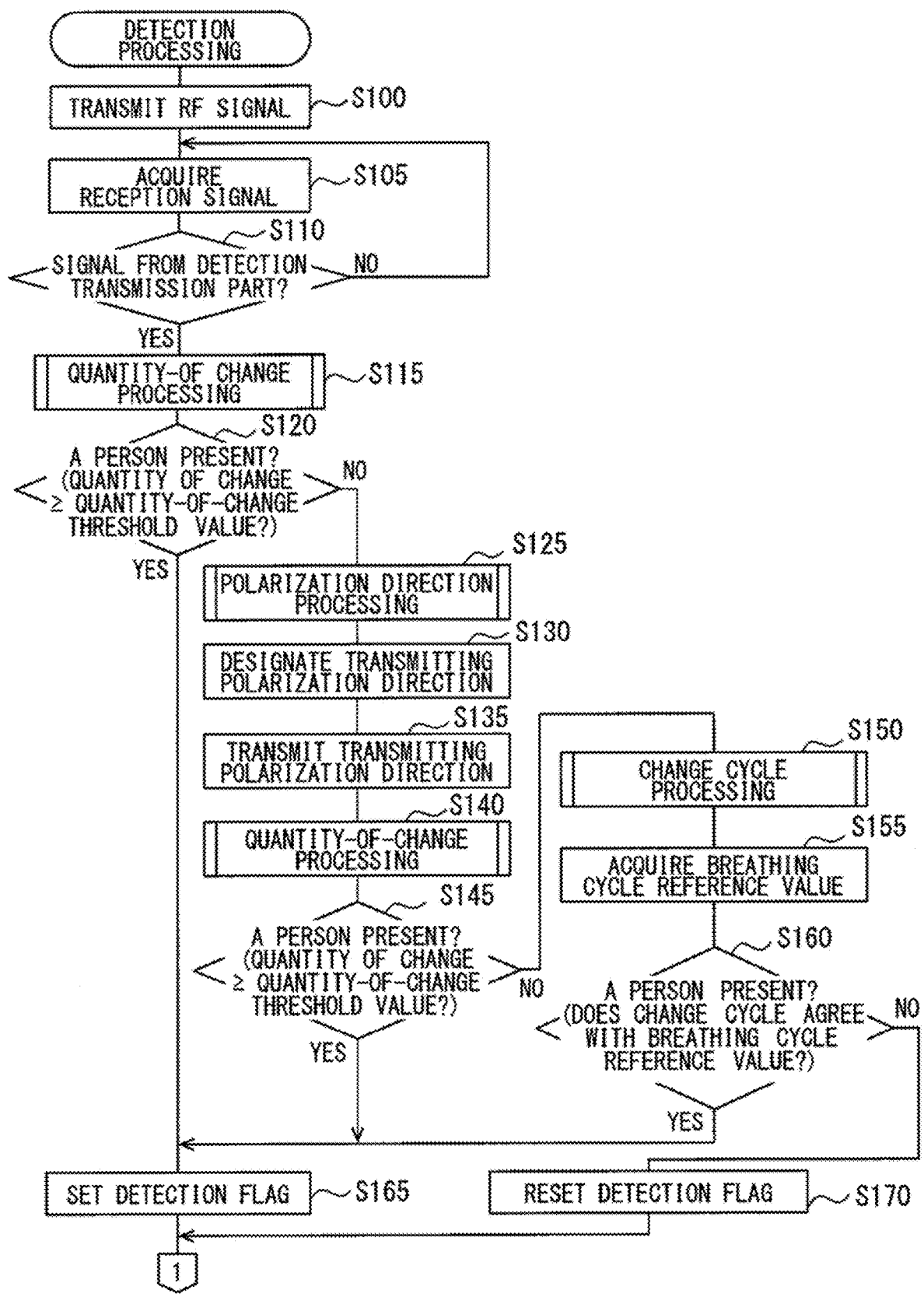
FIG. 5A is a flowchart showing a first half of detection processing.
Figure 5B:
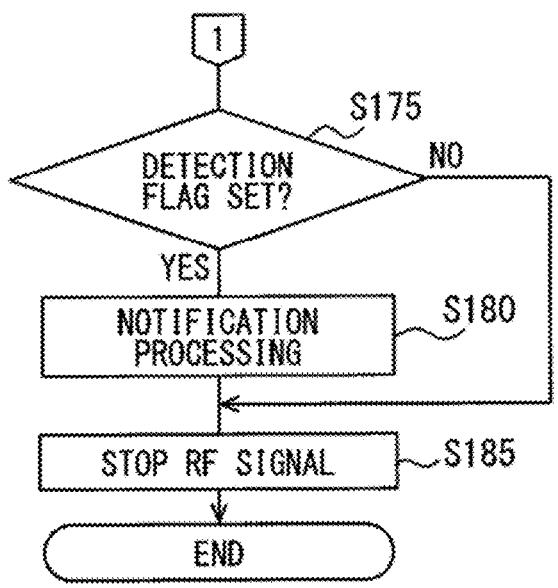
FIG. 5B is a flowchart showing a second half of the detection processing.
Figure 6:
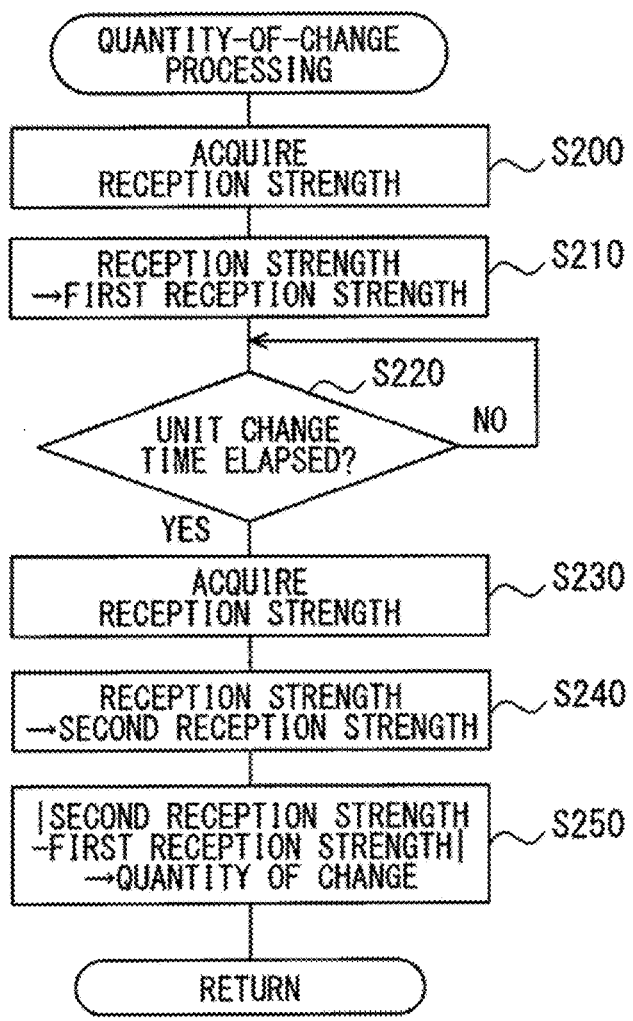
FIG. 6 is a flowchart showing quantity-of-change processing.

The quantity-of-change processing performed in S115 and S140 in the flowchart described in FIG. 5A is described below with reference to a flowchart in FIG. 6.

The reception strength is acquired in S200 from the reception portion 122.

The reception strength acquired in S200 is recorded in S210 in the memory 54 as a first reception strength.

It is determined in S220 whether the predetermined unit change time has elapsed. As described above, the unit change time is set as appropriate, for example, to one second to a few seconds. When the unit change time has not elapsed, a standby state is placed until the unit change time elapses. When the unit change time has elapsed, the flowchart proceeds to S230.

The reception strength after the elapse of the unit change time since the acquisition of the first reception strength in S200 is acquired in S230.

The reception strength acquired in S230 is recorded in S240 in the memory 54 as a second reception strength.

The absolute value of the difference between the second reception strength and the first reception strength is recorded in S250 din the memory 54 as the quantity of change. The quantity-of-change processing is finished.

Figure 7:
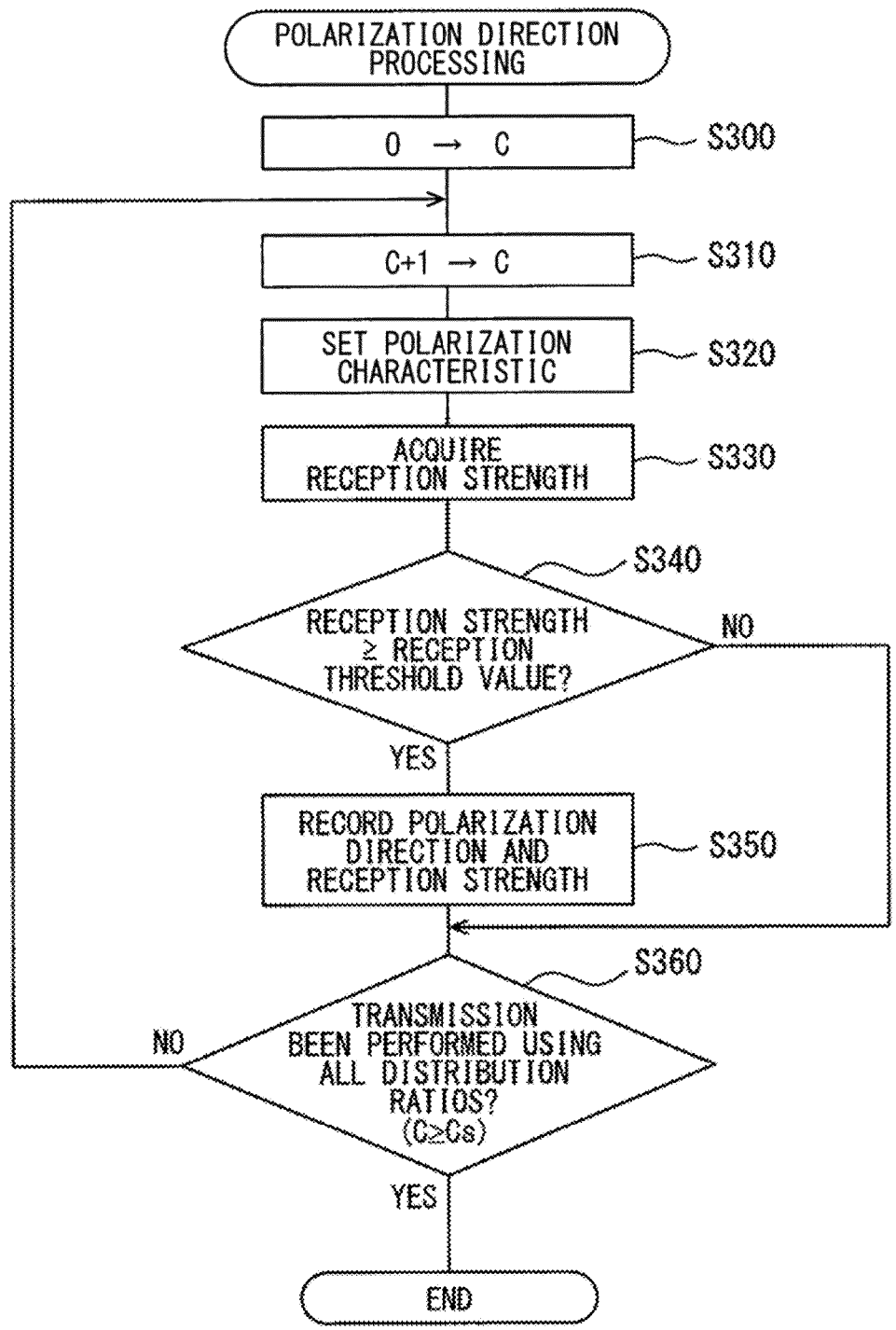
FIG. 7 is a flowchart showing polarization direction processing.

The polarization direction processing performed in S125 in the flowchart described in FIG. 5A is described below with reference to a flowchart in FIG. 7.

First, a counter C is reset in S300. That is, zero is substituted in the counter C. The value of the counter C corresponds to the number representing the polarization direction in the distribution ratio table.

The value of the counter C is incremented by one in S310.

A polarization characteristic of the antenna portion 23 is set in S320. Specifically, a distribution ratio for a polarization direction represented by the number that corresponds to the value of the counter C based on the distribution ratio table recorded in the memory 54 is read. Then, the distribution ratio signal indicating the distribution ratio that has been read is output to the generation portion 21. For example, when the value of the counter C is one, distribution ratios signal indicating 0:10, which is the distribution ratio for the polarization direction 1, is output.

The reception strength is acquired in S330 from the reception portion 122.

It is determined in S340 whether the reception strength acquired in S330 is equal to or greater than the predetermined reception threshold value. The reception threshold value is preset to a value that is equal to or greater than a minimum value of the reception strength receivable by the reception portion 122. When the reception strength is equal to or greater than the reception threshold value, the flowchart proceeds to S350. When the reception threshold value is smaller than the reception threshold value, the flowchart proceeds to S360.

The polarization direction, i.e., the number representing the polarization direction, and the reception strength acquired in S340 are recorded in S350 in the memory 54.

It is determined in S360 whether an RF signal has been transmitted using all the distribution ratios set in the distribution ratio table. Here, it is determined that an RF signal is transmitted using all the distribution ratios when the value of the counter C is equal to or greater than Cs, with Cs being the number of distribution ratios set in the distribution ratio table. In the distribution ratio table illustrated in FIG. 4, Cs is set to 11. When an RF signal has not been transmitted using all the distribution ratios, the flowchart proceeds to S310. When an RF signal has been transmitted using all the distribution ratios, the polarization direction processing is finished.

In this manner, the correspondence between the polarization directions and their associated reception strength values of the polarization directions, as illustrated in FIG. 8, is recorded in memory 54.

Figure 9:
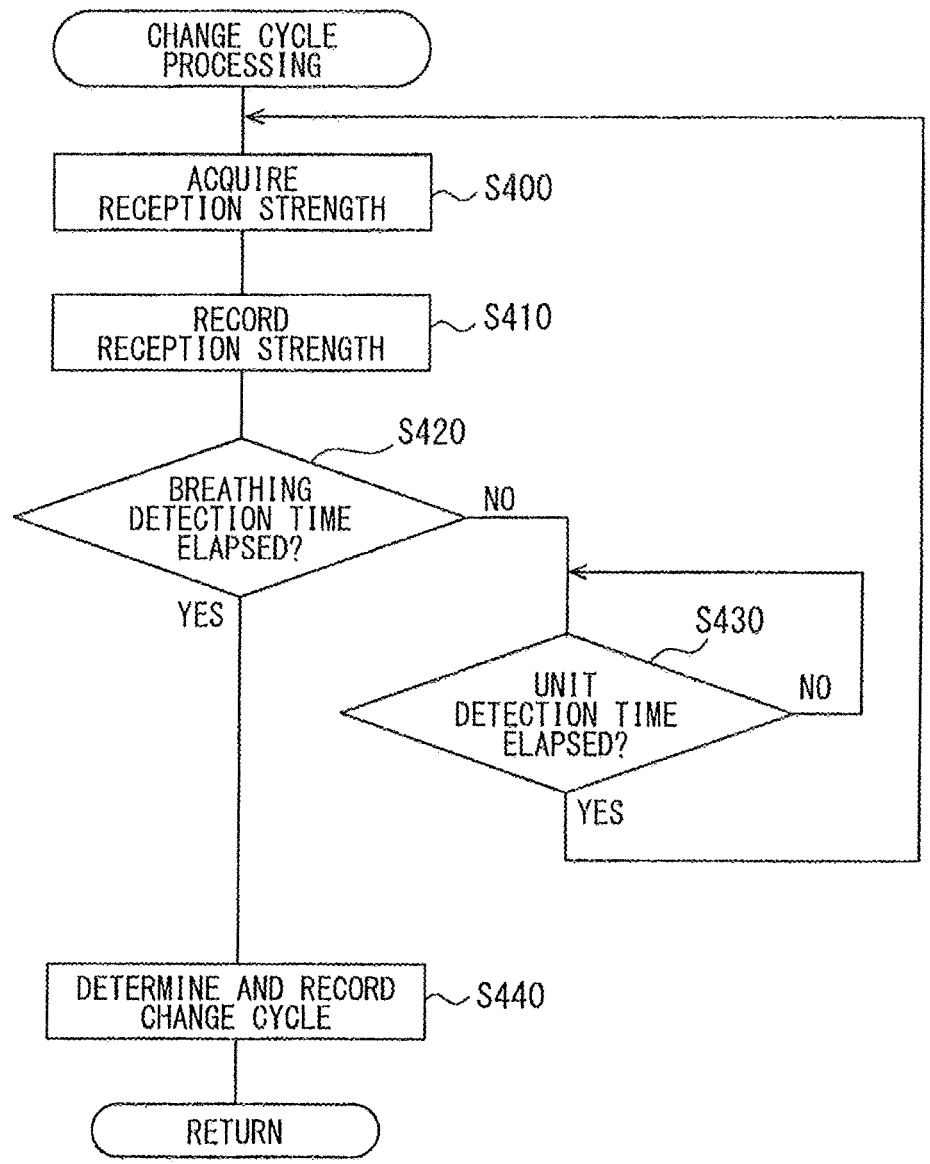
FIG. 9 is a flowchart showing change cycle processing.

The change cycle processing performed in S150 in the flowchart described in FIG. 5A is described below with reference to a flowchart in FIG. 9.

The reception strength is acquired in S400 from the reception portion 122.

The reception strength acquired in S400 is recorded in S410 in the memory 54.

It is determined in S420 whether the breathing detection time, which is predetermined, has elapsed since the start of the present change cycle processing. The breathing detection time is set to a time that is longer than a predetermined time taken for a human to breathe once by taking in air and sending it out and may be, for example, several seconds. When the breathing detection time has not elapsed, the flowchart proceeds to S430. When the breathing detection time has elapsed, the flowchart proceeds to S440.

It is determined in S430 whether a predetermined unit detection time has elapsed since the most recent acquisition of the reception strength in S400. The unit detection time is shorter than the breathing detection time and is set to, for example, a time approximately between one tenth and one ninetieth of the breathing detection time. When the unit detection time has not elapsed, a standby state is placed. When the unit detection time has elapsed, the flowchart proceeds to S400.

In other words, an operation in which the reception strength is acquired and recorded in the memory 54 is performed once each unit detection time and this repetitive acquisition and recording of a reception strength is continued until the breathing detection time has elapsed.

In S440 to which the flowchart proceeds when the breathing detection time has elapsed, a change cycle is determined. Specifically, multiple local maximum values are detected from the reception strength values recorded in S410 in the memory 54 during the breathing detection time. Then, a time from when one of the detected local maximum values is detected until when the next local maximum value is detected is calculated. The calculated time is designated as the change cycle.

The change cycle determined in S430 is recorded in S440 in the memory 54. Then, the change cycle processing is finished.

Figure 10:
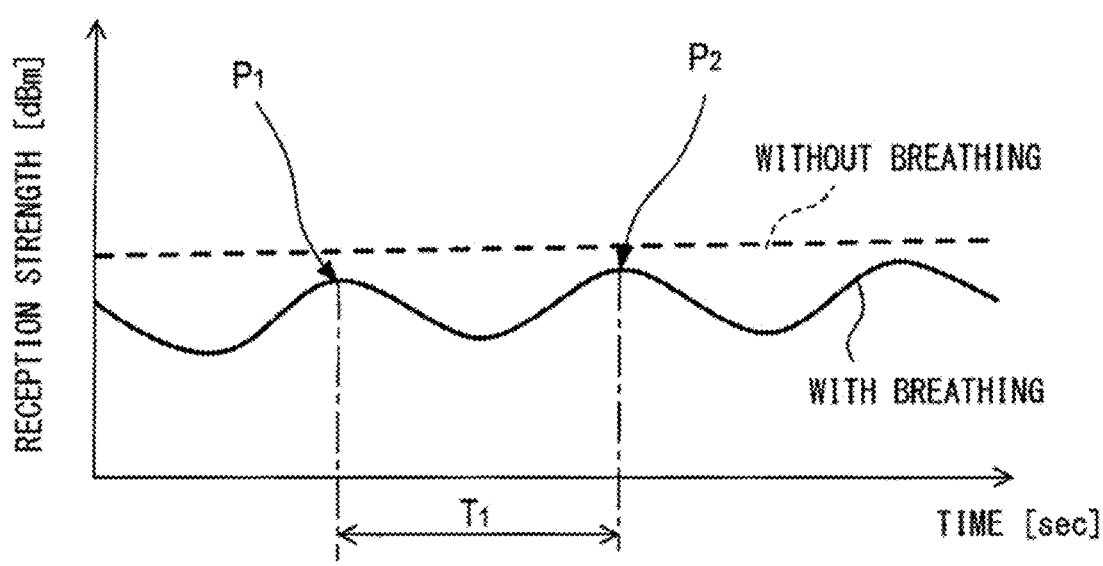
FIG. 10 is a diagram showing a change in reception strength over time with and without breathing.

In this manner, a change cycle T1 is determined based on the timings at which the local maximum values P1 and P2 are detected, as illustrated in FIG. 10.

The method to determine the change cycle T1 is not limited to this configuration. For example, a time from when a local maximum value is detected until when the next local maximum value is detected is detected more than once and their mean value may be designated as the change cycle. Alternatively, a change cycle may be determined based on, for example, local minimum values in place of local maximum values.

According to the first embodiment described above in detail produces, it may be possible to achieve, for example, the following effects.

(1A) The in-vehicle apparatus 3 includes the detection transmitter 20, the in-vehicle receiver 12, and the control ECU 50. The detection transmitter 20 transmits RF signals, which are electric waves, toward the inside of the vehicle continuously or more than once. Each time the detection transmitter 20 transmits an RF signal, the in-vehicle receiver 12 receives the transmitted RF signal inside the vehicle and provides an output in accordance with the reception strength of the received RF signal. The control ECU 50 compares the change mode of the reception strength of the RF signal received by the in-vehicle receiver 12 changing over time to the predetermined reference mode and determines whether a person is present between the in-vehicle receiver 12 and the detection transmitter 20.

In this manner, the presence or absence of a person in a vehicle is detected based on an electric wave received due to penetration, diffraction, or the like by way of the person located between the in-vehicle receiver 12 and the detection transmitter 20. It may be possible to use an electric wave at a frequency lower than that used in the conventional technique, which detects the presence or absence of a person in a vehicle by using an electric wave reflected off a person as is. As a result, it may be possible to reduce the scale of a circuit in the device that detects a person present in a vehicle so as to be smaller than that of the conventional technique.

(1B) The control ECU 50 may determine that a person is present between the in-vehicle receiver 12 and the detection transmitter 20 when the quantity of change in reception strength over time is equal to or greater than the predetermined quantity-of-change threshold value. Since the determination is based on the quantity of change in reception strength, it may be possible to simplify the processing performed by the control ECU 50.

(1C) The control ECU 50 may determine that a person is present between the in-vehicle receiver 12 and the detection transmitter 20 when the cycle of change in reception strength over time agrees with a predetermined cycle that is a human breathing cycle. In this manner, the determination is based on the cycle of change in reception strength, and it may be possible to accurately determine whether a person, who may be, for example, at rest or sleeping, making small movement and thereby producing a small quantity of change in reception strength, is present in a vehicle.

(1D) To determine whether a person, who may be at rest or sleeping, is present in a vehicle accurately, it may be desirable that a mode of change in reception strength caused by a slight movement of a person, such as breathing, be detected accurately.

To detect a mode of change in reception strength caused by a slight movement of a person accurately when an RF signal is transmitted by the detection transmitter 20, it may be desirable that the reception portion 122 be in a position where the reception strength changes steeply in a vehicle. In other words, in a comparison between FIG. 11 and FIG. 12, which illustrate the reception strength of an RF signal in a vehicle, it may be desirable that the reception strength of an RF signal be distributed in a vehicle as in FIG. 11.

Figure 11:
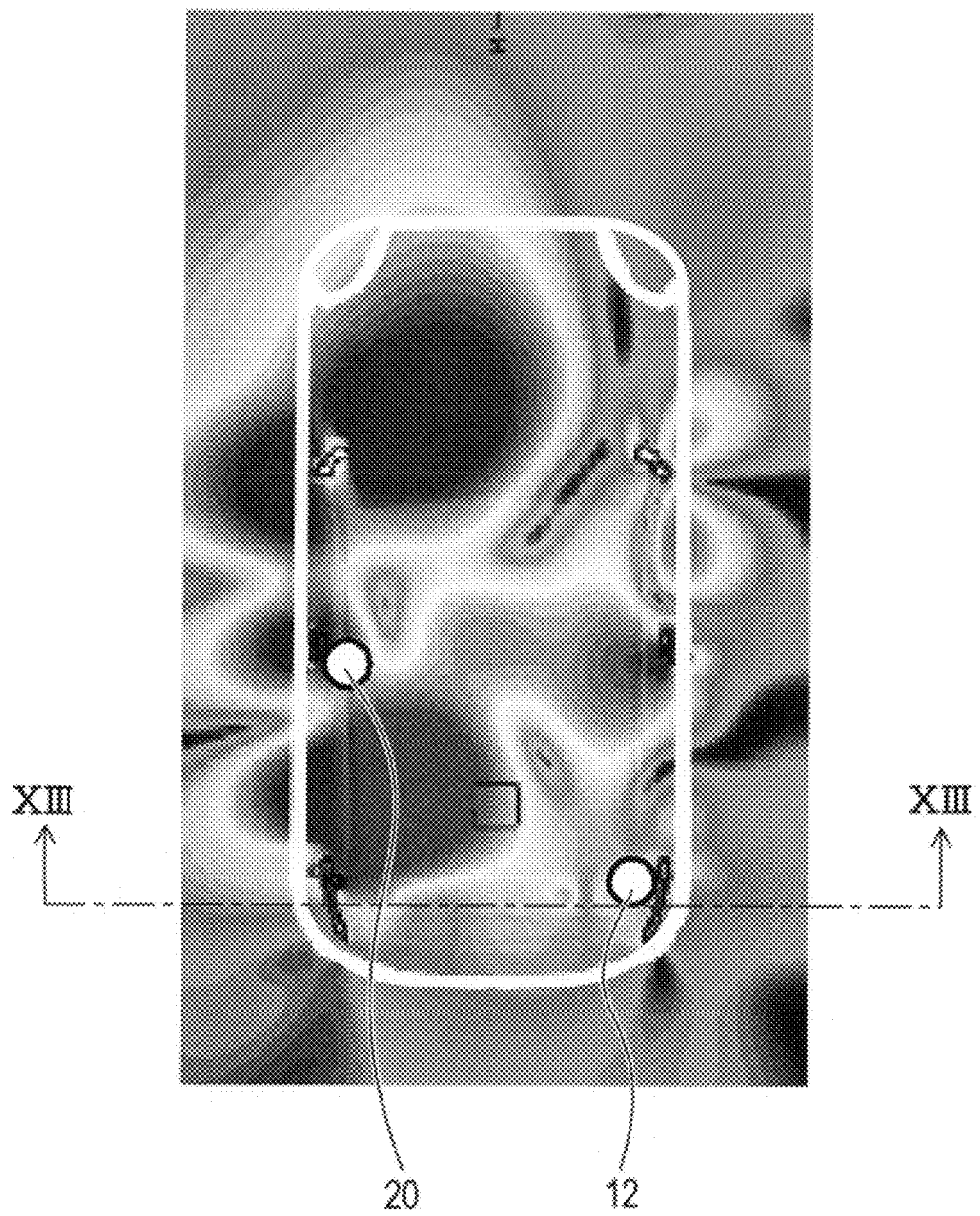
FIG. 11 is a diagram showing distribution of reception strength in a vehicle when an RF signal that is an electric wave having a polarization direction in a certain direction is transmitted from the detection transmitter.
Figure 12:
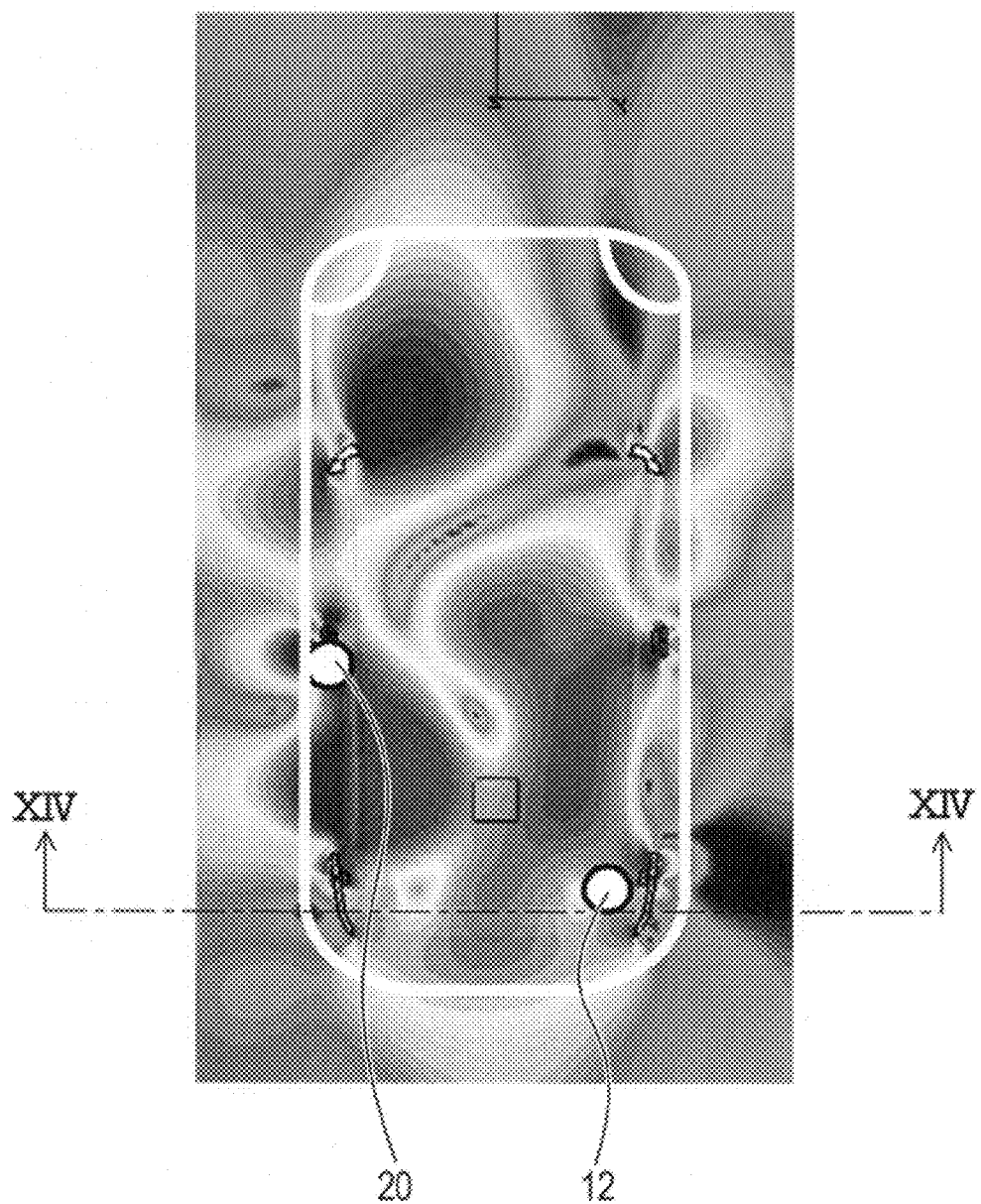
FIG. 12 is a diagram showing distribution of the reception strength in the vehicle when an RF signal that is an electric wave having the polarization direction in a direction different from that in FIG. 11 is transmitted from the detection transmitter.
Figure 13:
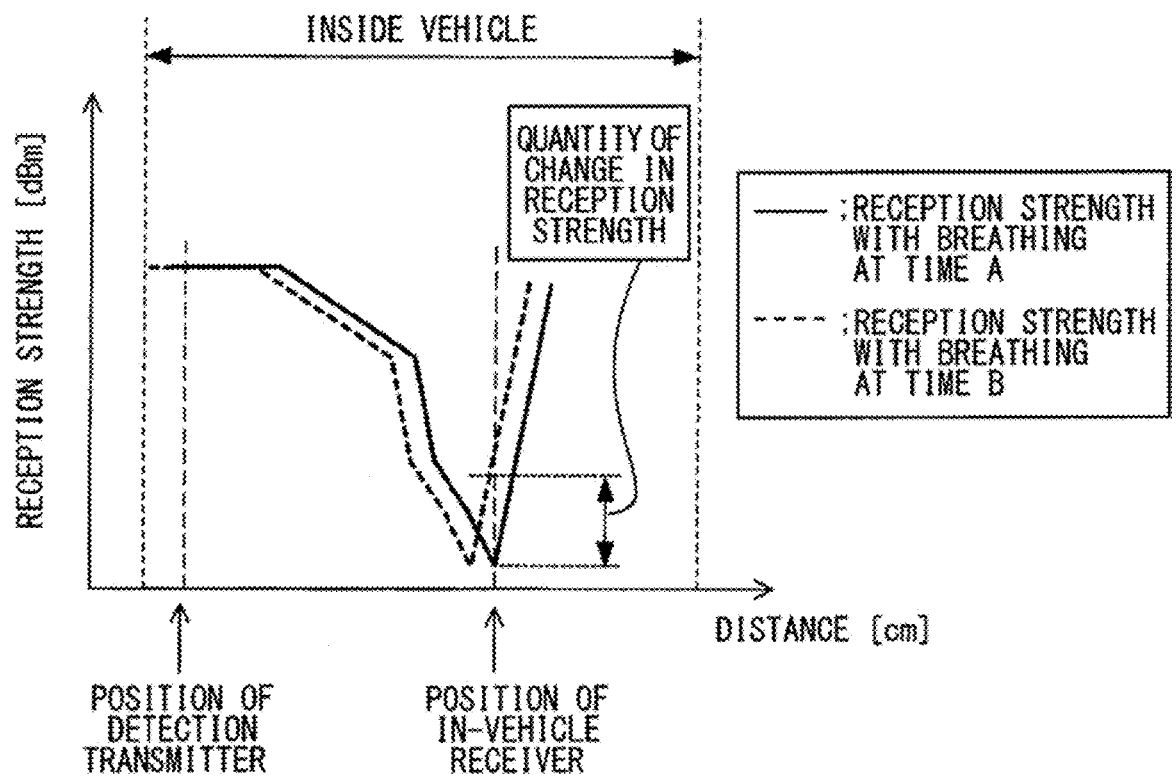
FIG. 13 is a diagram showing a relationship between a position in a vehicle-width direction of the vehicle in a section taken along line XIII-XIII in FIG. 11 and the reception strength.
Figure 14:
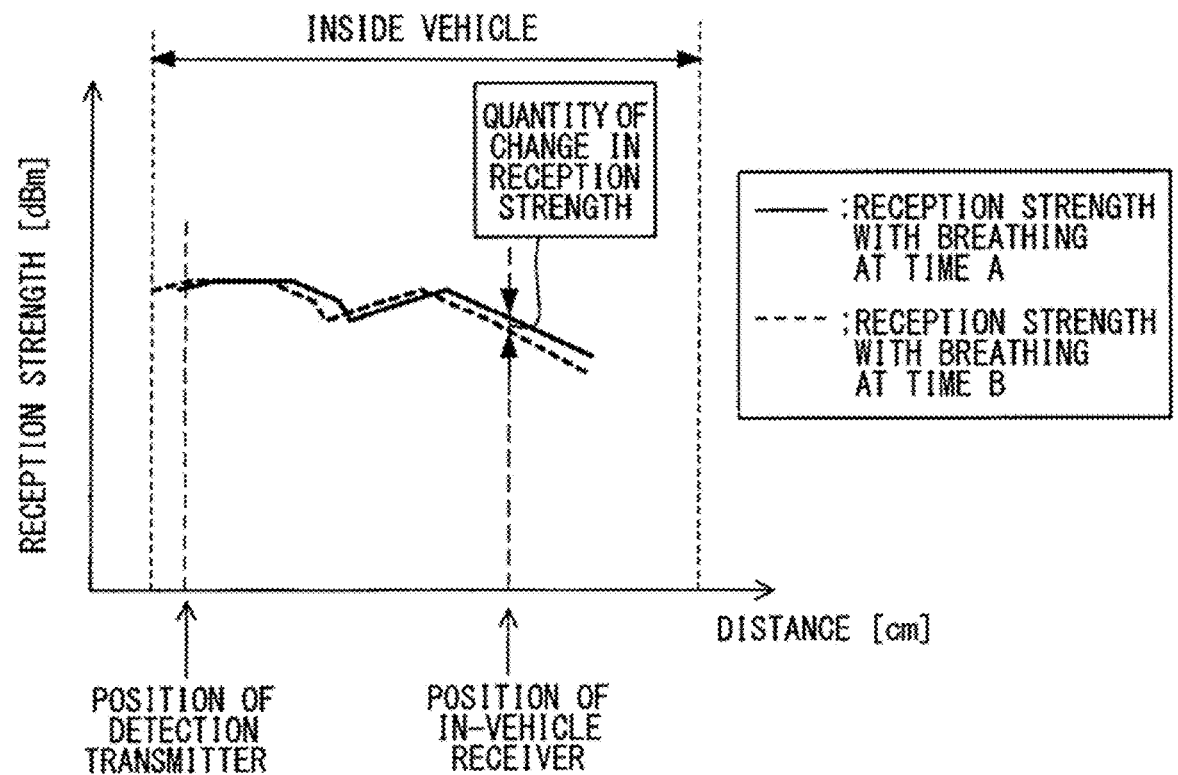
FIG. 14 is a diagram showing a relationship between the position in the vehicle-width direction of the vehicle in a section taken along line XIV-XIV in FIG. 12 and the reception strength.

As demonstrated by a comparison between FIG. 13 and FIG. 14, the distribution of the reception strength as in FIG. 11 allows a change in reception strength caused by a slight movement of a person, such as breathing, to be detected as a larger change than that of the distribution of the reception strength as in FIG. 12.

Hence, the control ECU 50 may further include a designation portion (S130) that causes the detection transmitter 20 to transmit an electric wave with the polarization direction varied so as to transmit electric waves in polarization directions, acquires reception strength values of the electric waves transmitted in the polarization directions when the electric waves are received by the in-vehicle receiver 12, and designates one of polarization directions that are located next to each other and have reception strength values that produce the largest difference as a transmission polarization direction. The control ECU 50 may further include a determination command portion (S145) that causes the detection transmitter 20 to transmit an electric wave in the transmission polarization direction and causes a determination portion to determine whether a person is present based on the reception strength of the electric wave transmitted in the transmission polarization direction.

In other words, the designation portion may cause the detection transmitter 20 to transmit an RF signal with the polarization direction varied so as to transmit RF signals in polarization directions and designate a polarization direction having a reception strength that changes steeply near the position of the reception portion 122 as the transmission polarization direction. In the present embodiment, the designation portion designates one of polarization directions that are located next to each other and have reception strength values that produce the largest difference as the transmission polarization direction, the one of the polarization directions having the smaller reception strength value.

In this manner, detection of a change mode of the reception strength caused by a slight movement of a person is facilitated and thereby it may be possible to accurately determine whether a person is present in a vehicle.

(1E) The designation portion may designate one of polarization directions having reception strength values that are equal to or greater than a predetermined reception threshold value as the transmission polarization direction. In this manner, the reception portion 122 can reliably receive an electric wave transmitted by the detection transmitter 20 and having the polarization direction in the transmission polarization direction.

In the first embodiment, the in-vehicle apparatus 3 corresponds to an example of a detection apparatus, the in-vehicle receiver 12 corresponds to an example of a receiver, the detection transmitter 20 corresponds to an example of a transmission portion, and the control ECU 50 corresponds to an example of the determination portion. Additionally, S130 corresponds to an example of processing of a designation portion, and S145 corresponds to an example of processing of a determination command portion.

(1-4. Modification)

The control ECU 50 may perform the detection processing illustrated in the flowchart in FIG. 5A with S125 to S160 deleted. That is, when the decision in S120 is in the negative, the flowchart may proceed to S170.

Alternatively, the control ECU 50 may perform the detection processing illustrated in the flowchart in FIG. 5A with S150 to S160 deleted.

That is, when the decision in S145 is in the negative, the flowchart may proceed to S170.

2. Second Embodiment (2-1. Configuration)

The second embodiment has a basic configuration similar to that of the first embodiment. Their differences are mainly described below, with the description of common components omitted. Symbols identical with those in the first embodiment indicate identical components, for which the foregoing description should be referenced.

The second embodiment is different from the first embodiment in that a result of detection performed in the detection processing in the first embodiment is used for a burglar notification processing in the second embodiment. That is, the second embodiment is different from the first embodiment in that the control ECU 50 performs the burglar notification processing in parallel with detection processing. Additionally, S175 to S180 are deleted from the detection processing illustrated in FIG. 5A and FIG. 5B of the first embodiment in the detection processing used for the burglar notification processing.

(2-2. Processing)

The detection processing performed by the control ECU 50 in the present embodiment is described below. In the present embodiment, the control ECU 50 finishes the detection processing after setting the detection flag in S165 or resetting the detection flag in S175.

The burglar notification processing performed by the control ECU 50 in the present embodiment is described below. A driver may park a subject vehicle, lock all the entrance doors, and leave the subject vehicle without noticing a potential thief hiding in the vehicle, thereby creating a situation that allows the potential thief to steal the subject vehicle, for example. The burglar notification processing prevents such a potential thief hiding in a subject vehicle from stealing the subject vehicle.

Figure 15:
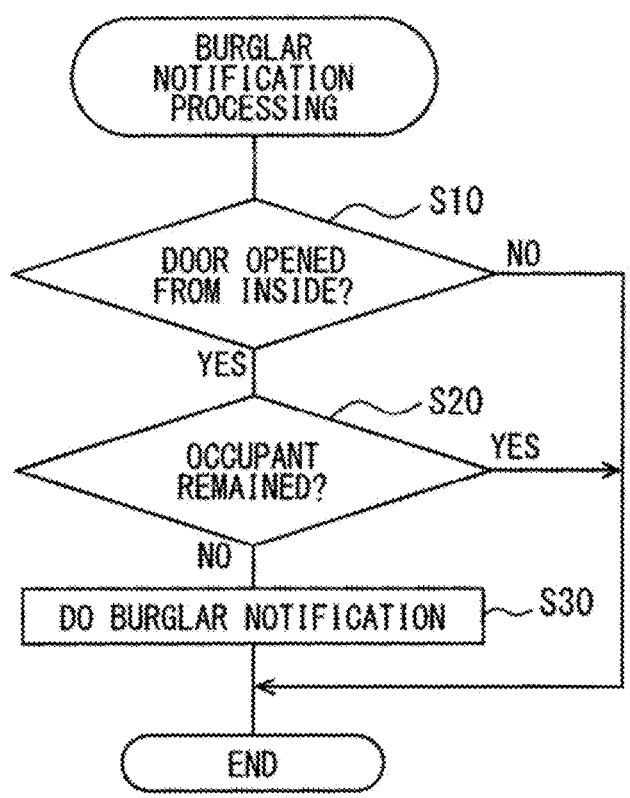
FIG. 15 is a flowchart showing burglar notification processing.

When the subject vehicle is parked and all the entrance doors are locked, the burglar notification processing is triggered and then performed repeatedly each predetermined period. The burglar notification processing is described with reference to a flowchart in FIG. 15.

It is determined in S10 whether any of the entrance doors is opened from inside the subject vehicle. Specifically, when the door open/close switch 33 detects opening of any of the entrance doors and unlocking of the door lock of the opened entrance door by an operation on the interior switch 34 placed on the entrance door, it is determined that the entrance door is opened from inside the subject vehicle.

When it is determined in S10 that none of the entrance doors is opened from inside the subject vehicle, the burglar notification processing is finished. When it is determined that any of the entrance doors is opened from inside the subject vehicle, the flowchart proceeds to S20.

It is determined in S20 whether an occupant has remained in the rear seat 7 of the subject vehicle since the time of parking the subject vehicle and locking all the entrance doors. When it is determined in S20 that an occupant has remained in the rear seat 7 of the subject vehicle, the present burglar notification processing is finished. When it is determined that no occupant has remained in the rear seat 7 of the subject vehicle, the flowchart proceeds to S30.

Specifically, it is determined that an occupant has remained in the rear seat 7 of the subject vehicle since the time of parking the subject vehicle and locking all the entrance doors when the person detection flag has been set.

A burglar notification is provided in S30 and the present burglar notification processing is finished. Specifically, as the burglar notification, the speaker 42 is caused to generate a warning sound toward the outside of the vehicle.

The second embodiment described above in detail produces, for example, the following effects in addition to the effects of the first embodiment (1A) to (1E).

(2A) A warning sound is generated when no occupant has remained in a subject vehicle since the time of parking the subject vehicle and locking all the entrance doors and any of the entrance doors is then opened from inside the subject vehicle. This effect can notify the outside of the subject vehicle of the presence of a potential thief in the subject vehicle, thereby it may be possible to prevent the potential thief from stealing the subject vehicle.

No warning sound is generated when an occupant has remained in the subject vehicle since the time of parking the subject vehicle and locking all the entrance doors and any of the entrance doors is then opened from inside the subject vehicle, on the assumption that the occupant has opened the door. In this manner, it may be possible to prevent generation of an unnecessary warning sound during the burglar notification processing.

3. Other Embodiments

While some embodiments of the present disclosure have been described, the present disclosure is not limited to the embodiments described above and can be modified in various manners.

(3A) In the embodiments described above, electric power is supplied to the first detection antenna 231 and the second detection antenna 232 in the same phase and the transmission polarization direction is designated within the range of 90°, but it is not limited to this configuration.

For example, electric power having the phase shifted by 180° may be supplied to the first detection antenna 231 with the distribution ratio varied in a similar manner, so that a transmission polarization direction is designated in the range of ±90° including the second polarization direction, that is, in the total range of 180°. Alternatively, the phase of the second detection antenna 232 may be shifted in a similar manner, so that a transmission polarization direction is designated in the range of ±90° including the first polarization direction, that is, in the total range of 180°.

Alternatively, electric power having the phase shifted by 180° may be supplied to the first detection antenna 231 and electric power having the phase shifted by 180° may be supplied also to the second detection antenna 232, so that a transmission polarization direction is designated within the total range of 360°.

(3B) In the embodiments described above, the polarization direction of the antenna portion 23 in the detection transmitter 20 is varied. Alternatively, the polarization direction of the in-vehicle reception antenna 121 in the in-vehicle receiver 12 may be varied, or the polarization directions of both the in-vehicle reception antenna 121 in the in-vehicle receiver 12 and the antenna portion 23 in the detection transmitter 20 may be varied.

(3C) In the embodiments described above, the control ECU 50 determines whether a person is present in a vehicle based on the change cycle, which is detected when an RF signal having the polarization direction in the transmission polarization direction is received, as described in S160 in the detection processing in FIG. 5A. Alternatively, processing similar to that in S150 to S160 may be performed in place of S115 to S120 in the detection processing in FIG. 5A, so that the determination of whether a person is present in the vehicle is performed based on the change cycle before the transmission polarization direction is designated in S130. That is, when the decision in S110 is in the affirmative, then, the processing similar to that in S150 to S160 may be performed. Then, when the decision in the processing similar to that in S160 is in the affirmative, then, the flowchart may proceed to S165. When the decision there is in the negative, the flowchart may proceed to S125.

Alternatively, in such detection processing, S125 to S160 may be deleted, so that, when the decision in the processing similar to that in S160 is in the negative, the flowchart may proceed to S170. Alternatively, in such detection processing, S150 to S160 may be deleted, so that, when the decision in S145 is in the negative, the flowchart may proceed to S170.

(3D) In the embodiments described above, electric waves transmitted by the mobile terminal 2 and RF signals, which are electric waves, transmitted by the detection transmitter 20 are in similar frequency bands that are in the UHF band. Thus, it is determined in S110 in the detection processing that the reception signal is from the detection transmitter 20 when an authentication code is not included in the reception data in the reception signal. The determination of whether the reception signal is from the detection transmitter 20 is not limited to this. The data transmitted by the detection transmitter 20 may have a data length different from that of the data transmitted by the mobile terminal 2. For example, the data length of the data from the detection transmitter 20 may be set longer than that from the mobile terminal 2. Then, the determination of whether a reception signal including reception data is from the detection transmitter 20 may be made based on the data length of the reception data.

(3E) The mobile terminal 2 may transmit a signal in a transmission frequency that is different from that of an RF signal transmitted by the detection transmitter 20, so that the determination of whether a reception signal is from the mobile terminal 2 or the detection transmitter 20 may be made based on the difference in the frequencies.

(3F) While the frequency of an RF signal transmitted by the detection transmitter 20 is set to a predetermined frequency in the UHF band in the embodiments described above, it is not limited to this configuration. The frequency of a detection transmission wave may be set in any frequency band, such as, for example, an ISM band. The word ISM represents industry science medical.

(3G) While the in-vehicle apparatus 3 uses the speaker 42 and the hazard lamp 43 to provide a warning toward the outside of a vehicle in the embodiments described above, it is not limited to this configuration. The in-vehicle apparatus 3 may include another component for providing a warning toward the outside of a vehicle.

(3H) While the in-vehicle apparatus 3 detects a person in the rear seat 7 in a subject vehicle in the embodiments described above, it is not limited to this configuration. The in-vehicle apparatus 3 may detect, for example, a person in the passenger seat. In such a case, the detection transmitter 20 and the in-vehicle receiver 12 may be placed such that a person in the passenger seat is placed between the detection transmitter 20 and the in-vehicle receiver 12. For example, the in-vehicle receiver 12 may be placed in a manner similar to that in the embodiments described above and the detection transmitter 20 may be placed on a floor surface near the passenger seat.

(3I) While the in-vehicle apparatus 3 is configured such that the in-vehicle receiver 12 receives electric waves transmitted by both the mobile terminal 2 and the detection transmitter 20 in the embodiments described above, it is not limited to this configuration. The in-vehicle apparatus 3 may be configured such that different devices receive electric waves from both the mobile terminal 2 and the detection transmitter 20.

(3J) While the embodiments described above includes a device to transmit an RF signal for detecting a person present in a subject vehicle (the detection transmitter 20) and a device to receive the RF signal (the in-vehicle receiver 12), it is not limited to this configuration. The in-vehicle apparatus 3 may include multiple detection transmitters 20 and multiple in-vehicle receivers 12.

(3K) A function served by a single component in the embodiments described above may be served by multiple components. Multiple functions served by multiple components may be served by a single component. A part of the configurations in the embodiments described above may be omitted. At least a part of the configuration of one of the embodiments described above may be added to that of the other one of the embodiments described above or replace that of the other one of the embodiments described above.

(3L) The present disclosure may be achieved in various forms other than the communication system 1, the in-vehicle apparatus 3, and the control ECU 50 described above. For example, a program for causing the control ECU 50 to function, a non-transitory tangible storage medium, such as a semiconductor memory, having the program stored therein, and a detection method may achieve the present disclosure.

It is noted that a flowchart or the processing of the flowchart in the present application includes multiple steps (also referred to as sections), each of which is represented, for instance, as S100. Further, each step can be divided into several sub-steps while several steps can be combined into a single step.

While various embodiments, configurations, and aspects of a detection apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A detection apparatus comprising:
a transmitter that transmits an electromagnetic wave toward an inside of a vehicle;
a receiver that receives the electromagnetic wave transmitted by the transmitter, and that provides an output based on a reception intensity of the electromagnetic wave; and
a processor configured to
compare a change in the reception intensity over time with a predetermined reference intensity, and, based on the reception intensity of the electromagnetic wave received by the receiver, to determine whether a person is present between the receiver and the transmitter,
control the transmitter to transmit electromagnetic waves having a predetermined plurality of polarizations and to change the polarizations,
acquire values of the reception intensity of the electromagnetic waves in response to the receiver receiving the electromagnetic waves having the polarizations, and
select, as a selected polarization, one of two polarizations among the polarizations transmitted by the transmitter, the two polarizations being in succession to each other and having a largest difference between the reception intensity values from among successive pairs of the plurality of polarizations transmitted by the transmitter, wherein
the processor is further configured to determine that a person is present between the receiver and the transmitter in response to a quantity of change in the reception intensity over time being equal to or greater than a predetermined quantity-of-change threshold value.

2. The detection apparatus according to claim 1, wherein:
the processor is further configured to determine that a person is present between the receiver and the transmitter in a case where a cycle of change in the reception intensity over time matches a predetermined cycle defined as a human breathing cycle.

3. The detection apparatus according to claim 1, wherein:
the processor is further configured to
control the transmitter to transmit the electromagnetic wave having the selected polarization; and
determine whether a person is present based on the reception intensity of the electric wave transmitted in the selected polarization.

4. The detection apparatus according to claim 3, wherein:
the reception intensity value of the electromagnetic wave having the selected polarization is equal to or greater than a predetermined reception threshold value.

5. The detection apparatus according to claim 1, wherein:
the change in the reception intensity includes at least one of:
a variation amount of the reception intensity over time; or
a cycle of change in the reception intensity.

6. The detection apparatus according to claim 1, wherein:
the receiver outputs, to the processor, a voltage value based on the reception intensity.

* * * * *